(12) United States Patent
Norkin et al.

(10) Patent No.: US 8,515,191 B2
(45) Date of Patent: Aug. 20, 2013

(54) DECODER AND A METHOD THEROF FOR IMPROVING DECODING OF IMAGE AND VIDEO SIGNALS

(75) Inventors: Andrey Norkin, Solna (SE); Kenneth Andersson, Gävle (SE); Clinton Priddle, Indooroopilly (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 13/065,406

(22) Filed: Mar. 22, 2011

(65) Prior Publication Data

US 2012/0230599 A1    Sep. 13, 2012

(30) Foreign Application Priority Data

Mar. 10, 2011    (WO) ................. PCT/EP2011/053580

(51) Int. Cl.
*G06K 9/36* (2006.01)
*G06K 9/46* (2006.01)

(52) U.S. Cl.
USPC .......................................... 382/233; 382/248

(58) Field of Classification Search
USPC .................... 382/233, 238, 248, 250
See application file for complete search history.

(56) References Cited

U.S. PATENT DOCUMENTS

2007/0242890 A1\* 10/2007 Wen et al. ...................... 382/233
2008/0013839 A1    1/2008 Kimura
2010/0290533 A1\* 11/2010 Minagawa ............... 375/240.23

FOREIGN PATENT DOCUMENTS

EP    0801506 A2    10/1997

OTHER PUBLICATIONS

Ichigaya, A., et al., Description of video coding technology proposal by NHK and Mitsubishi, Joint Collaborative Team on Video Coding (JCT-VC) of ITU-TSG16 WP3 and ISO/IEC JTC1/SC29/2G11, Dresden, DE, Apr. 18, 2010.
Abhayaratne, G. Charith K., Orthonormal Integer Block Transforms for Lossless Coding: Design and Performance Analysis, Visual Communications and Image Processing, Lugano, Jul. 8, 2003.
Samsung, MACe- and MACes-PDU Structure & E-TFI table definition, 3GPP TSG RAN2#45, Yokohama, Japan, Nov. 15-19, 2004, R2-042382.

\* cited by examiner

*Primary Examiner* — Phuoc Tran
(74) *Attorney, Agent, or Firm* — Coats & Bennett, PLLC (57) ABSTRACT

A solution according to one or more embodiments of the present invention is to reconstruct image blocks where only the frequency coefficient that is most sensitive to changes of an average value of the residual image block, typically the lowest frequency coefficient, is present with a flat residual image. The other image blocks are reconstructed by applying an inverse spatial 2D transform. Hence, the other image blocks comprise image blocks with multiple coefficients and image blocks with a single coefficient and wherein the single coefficient is not the coefficient determining that is most sensitive to changes of an average value of the residual image block.

12 Claims, 10 Drawing Sheets

DECODER AND A METHOD THEROF FOR IMPROVING DECODING OF IMAGE AND VIDEO SIGNALS

RELATED APPLICATIONS

This application claims priority to International Patent Application No. PCT/EP2011/053580, which was filed 10 Mar. 2011 and is incorporated herein by reference in its entirety.

TECHNICAL FIELD

The embodiments of the present invention relate to a decoder and a method thereof for improving decoding of image and video signals, and in particular a solution for avoiding artifacts generated in reconstructed image or video blocks.

BACKGROUND

Video coding typically consists of two main parts: prediction and coding of the prediction error, also referred to as residual. Prediction can be performed from previously coded pixels of the current frame, referred to as intra prediction or from a previously coded frame referred to as inter prediction. The residual is typically coded by a spatial 2D block transform such as a Discrete Cosine Transform (DCT) like transforms.

Spatial 2D transforms are typically used in image and video coding in order to exploit spatial correlation in image and video signals. In video coding, such transforms are applied to intra frame or inter frame prediction errors e.g. residuals.

The size of the transform can vary. For example, H.264 video standard exploits transforms of different sizes, such as 4×4 and 8×8. The spatial 2D transform is commonly used to decorrelate the signal and to improve the compression efficiency. The spatial 2D transform 110 is applied to the blocks of the original image or to the blocks of a residual image to produce transform coefficients $$c_i = \sum_{x=0}^{K-1} \sum_{y=0}^{L-1} r(x, y) * b_i(x, y)$$

where $r(x,y)$ is the residual at position $(x,y)$, $c_i$ are the transform coefficients for basis image and $b_i(x,y)$ is the 2D transform basis image i and K×L is the size of the residual block.

Figure 1:
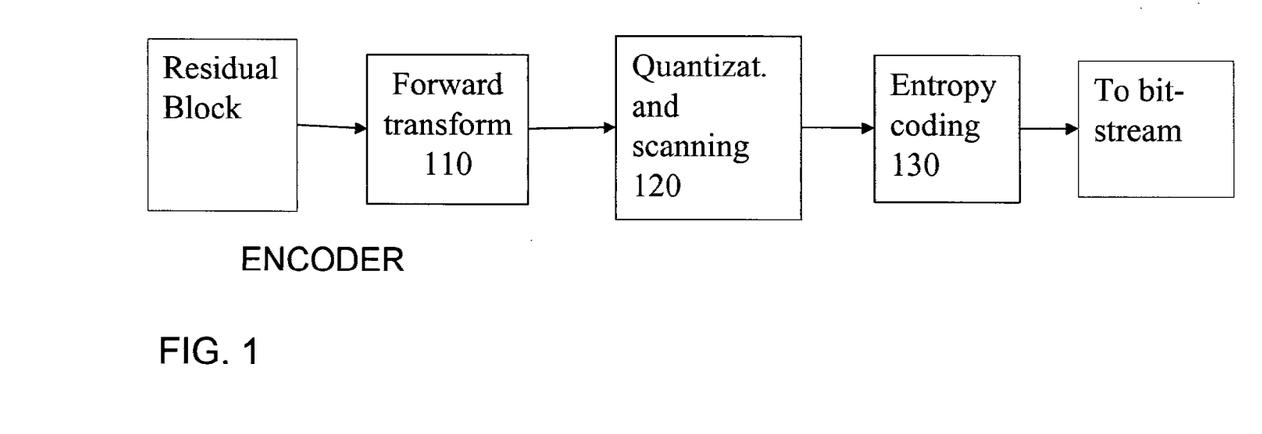
FIG. 1 illustrates a typical encoding of a residual block according to prior art.
Figure 2:
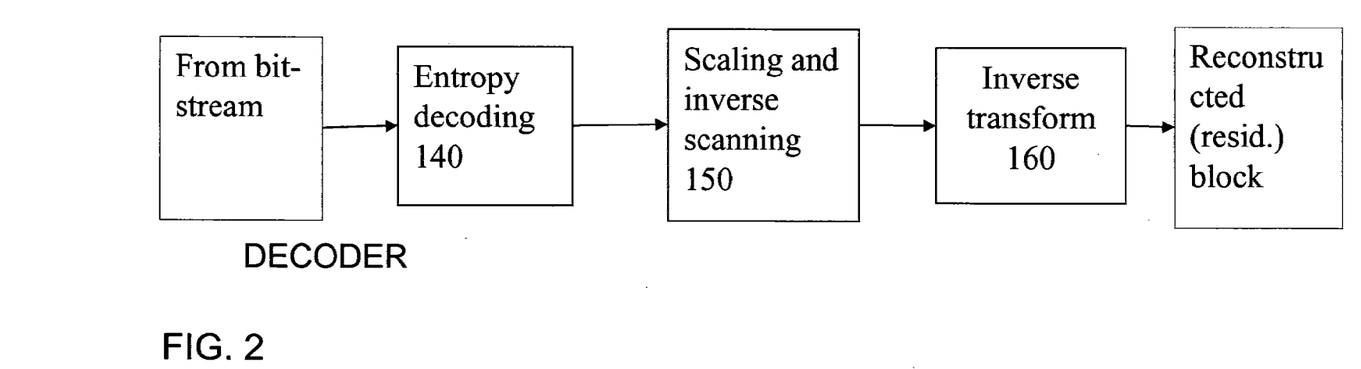
FIG. 2 illustrates a typical decoding of a residual block according to prior art.

Then, the transform coefficients of the spatial 2D transform are quantized, scanned by a quantization and scanning unit 120 and entropy coded by an entropy encoder 130 as illustrated in FIG. 1. The decoder performs the inverse operations as illustrated in FIG. 2. The received bit stream is entropy decoded by an entropy decoder 140 to obtain the transform coefficients. Then a scaling and inverse scanning unit 150 performs scaling and inverse scanning and an inverse transformer 160 inverse transform to obtain the reconstructed residual block. It should be noted that scaling is the inverse operation to quantization. The residual block can be decoded by a weighted summation of the 2D transform basis images of the transform as described below:

$$\hat{r}(x, y) = \sum_{i=0}^{N-1} \hat{c}_i * \hat{b}_i(x, y) \quad \text{(Eq. 1)}$$

where $\hat{r}(x,y)$ is the reconstructed residual at position $(x,y)$, $\hat{c}_i$ are the inverse quantized transform coefficients for basis image i and $\hat{b}_i(x,y)$ is the 2D transform basis image i and N is the number of transform basis images. A 4×4 transform has typically 16 transform basis images.

One of the spatial 2D transforms that can be used for image coding is Karhunen-Loève Transform (KLT) which is optimal among all the unitary transforms with respect to its energy compaction properties, i.e. the KLT packs most energy in the smallest number of coefficients. The KLT is basically a transform that is optimal for a "given" signal, the KLT would therefore look differently for different signals. In this specification, the different KLT-like transforms are derived for different types of intra-prediction residual e.g. vertical, horizontal or diagonal. Hence, the KLT is derived from training on the original signal.

Accordingly, the KLT basis functions depend on the statistics of the original signal and the parameters of the KLT should be communicated to the decoder. Alternatively, a significant amount of computations is needed to calculate KLT based on the image statistics. These are limiting factors for using KLT in image and video coders.

The Discrete Cosine Transform (DCT) and other transforms approximating the DCT are very popular in image and video coding due to good energy compaction properties of the DCT and existence of fast DCT algorithms. It has been found that the compression efficiency of the DCT is close to that of KLT when the signal to be compressed is slowly changing i.e. when the signal to be compressed has a correlation coefficient close to 1. Therefore, the DCT is considered as a good approximation of KLT for signals with positive correlation between samples such as natural images, which often exhibit high spatial correlation.

Another transform that can be used in image and video coding is a Discrete Sine Transform (DST) which approximates KLT when encoding signals with a negative correlation.

There are some other KLT approximations that have been used in video coding, e.g. in Mode-Dependent Directional Transforms (MDDT) tool in Key Technical Area (KTA) which is a VCEG H.264 based software. In MDDT, a set of KLT-like transforms is used to encode the intra-prediction residual. Each transform is optimized to fit the statistics of the particular type of the image residual namely, the residuals corresponding to different intra-prediction directions. The transforms are optimized beforehand and the transform is chosen based on the intra prediction mode of the current block. It has been shown that using MDDT instead of DCT for encoding intra-coded blocks can provide better compression efficiency.

A transform consist of several basis images corresponding to different frequencies. Each basis image has a value at each position of the block. The simplest basis image corresponds to the lowest frequency which is the average of the signal. The lowest frequency ("DC") basis image of the spatial 2D DCT is a function of a constant flat level.

Figure 5:
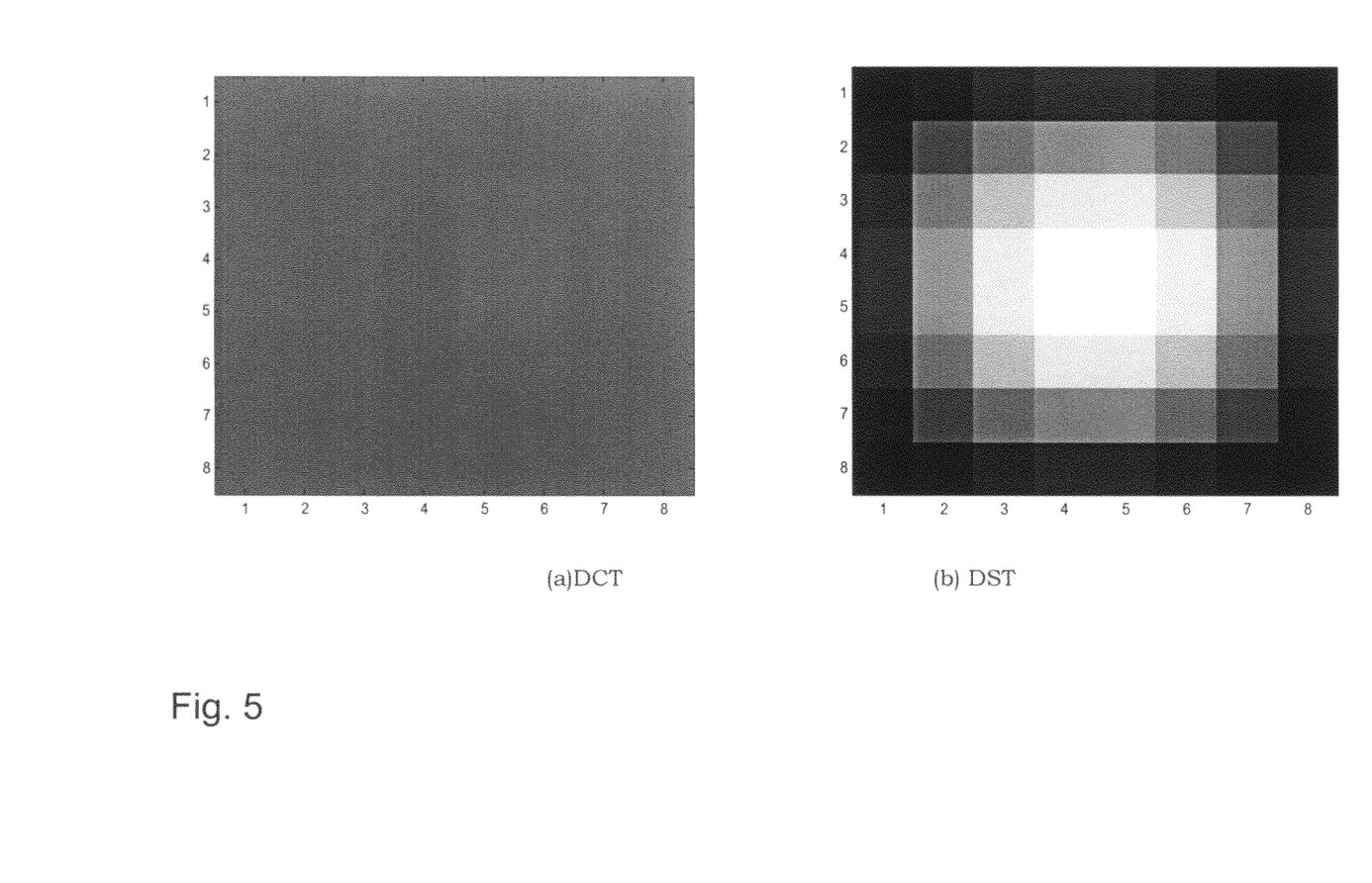
Figure 6:
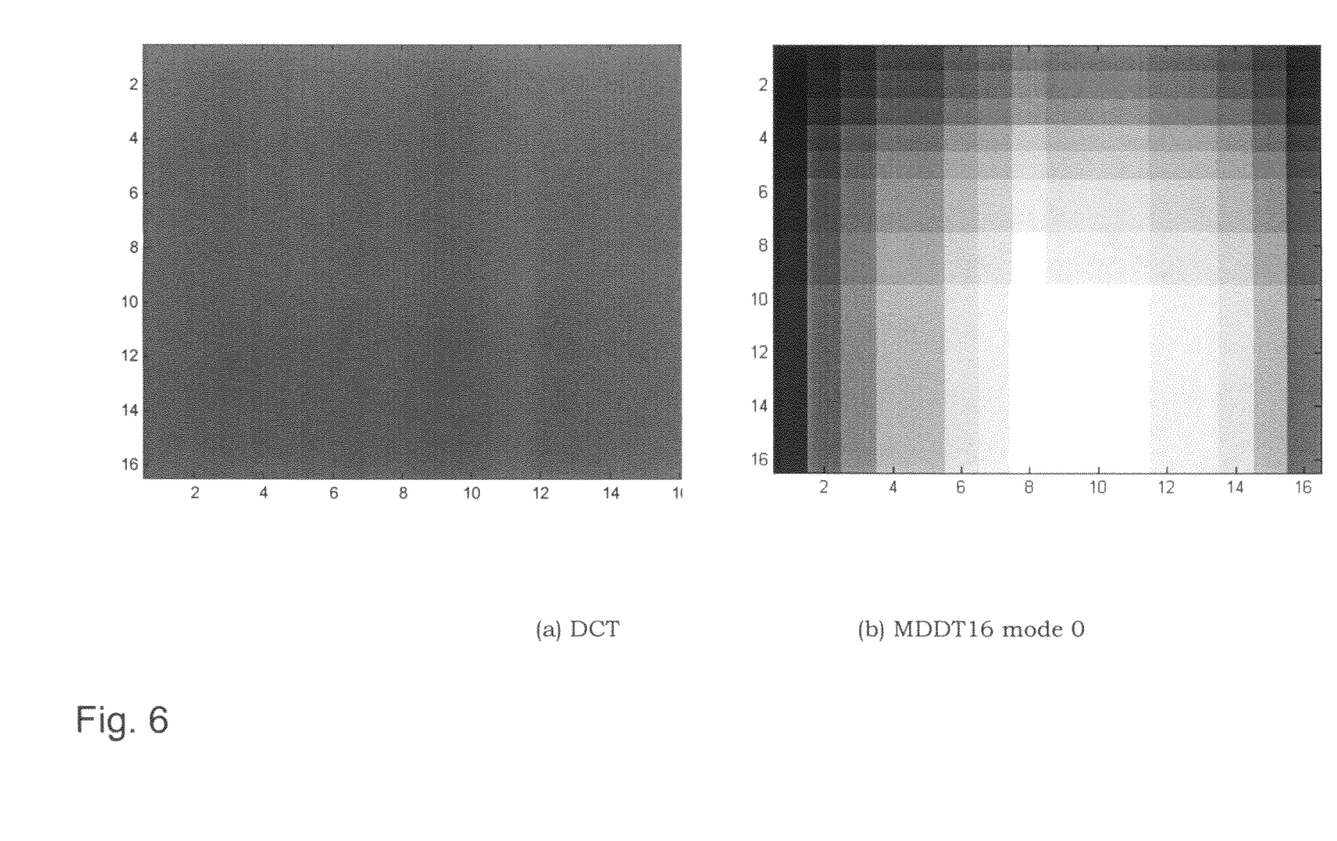

In contrast, the lowest frequency basis images of discrete sine transform (DST) and KLT-like transforms are often not flat and might have a curved or concave shape. FIG. 6 illustrates the values of the lowest frequency basis function of the KLT and FIG. 5 illustrates the "DC" basis image of the DST which also has a concave form.

Figure 3:
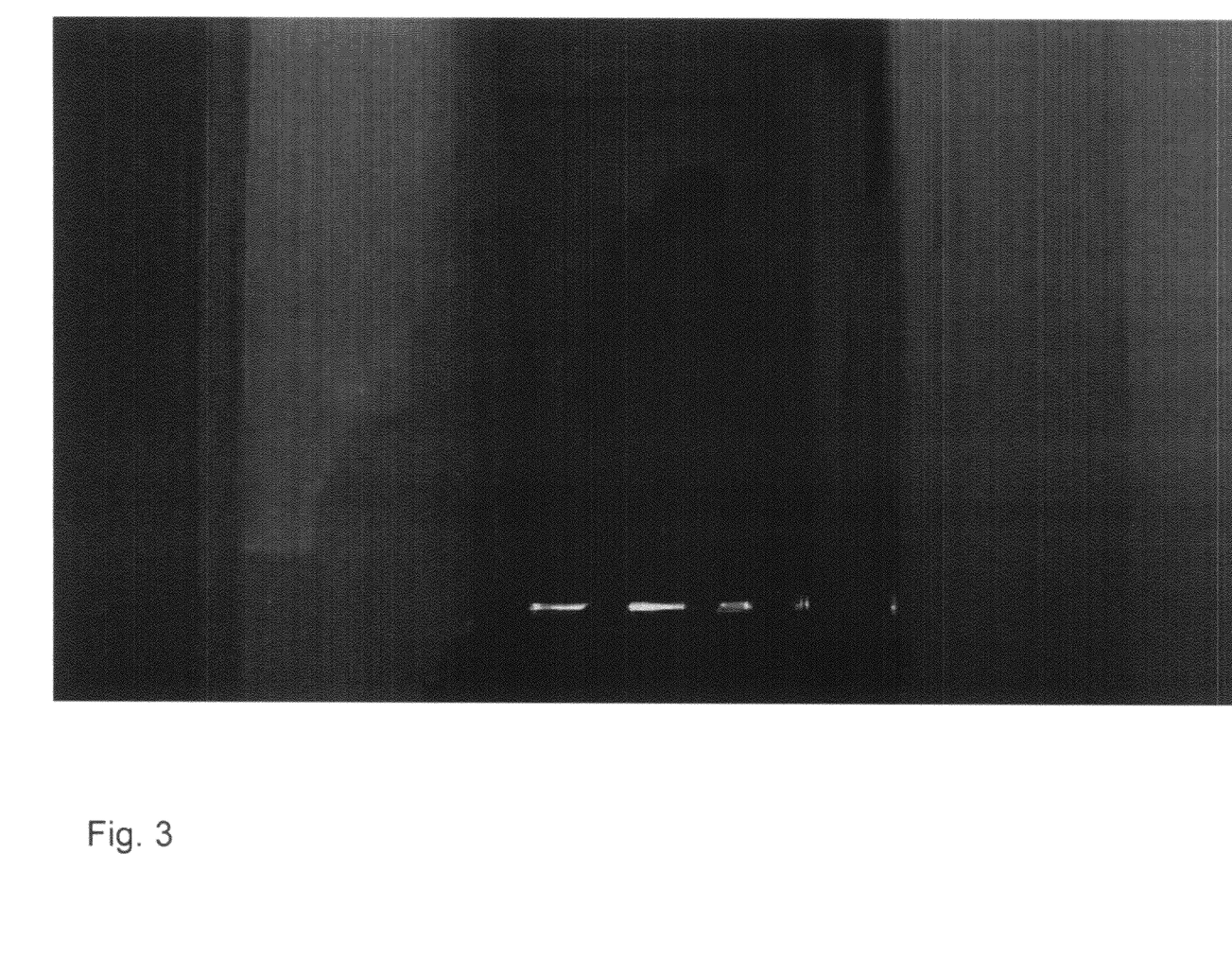
FIG. 3 illustrates artifacts due to the curved shape of "DC" basis image in MDDT.
Figure 4:
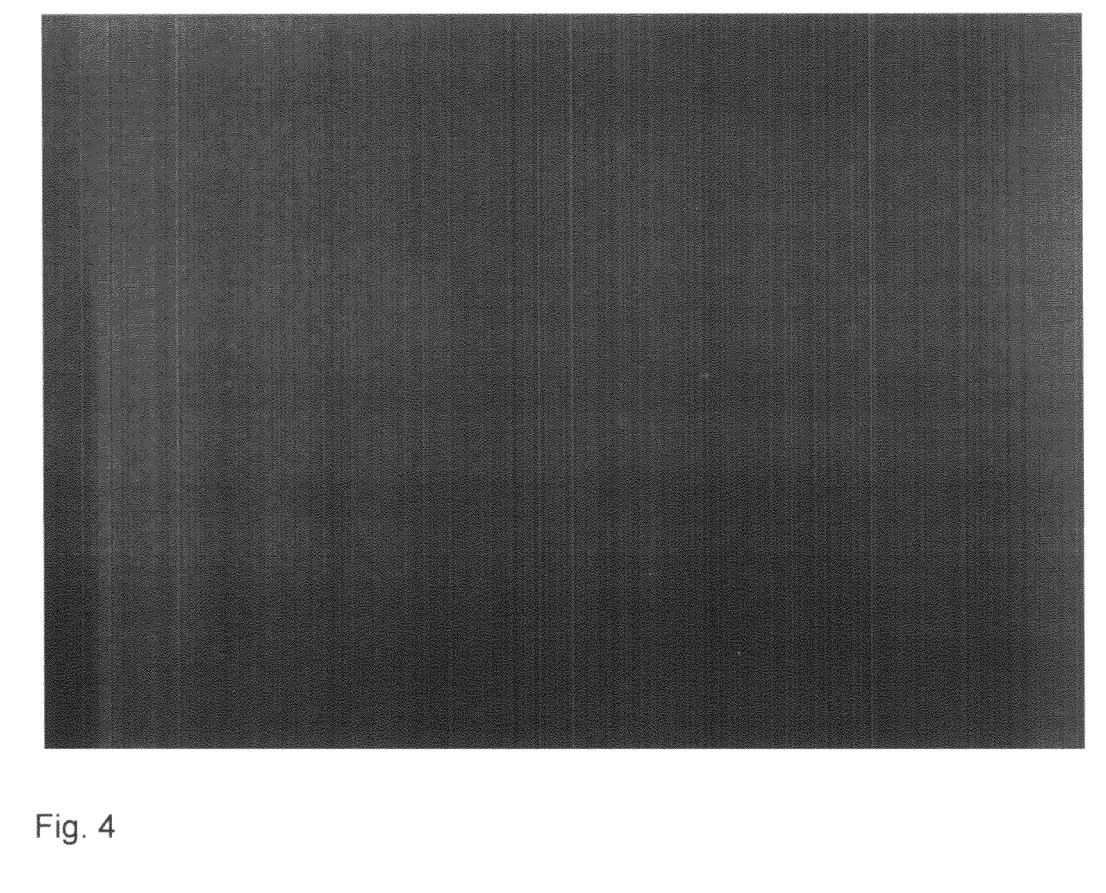
FIG. 4 illustrates the artifacts of FIG. 3 zoomed.

For some image blocks, multiple coefficients for a block are sent to the decoder. The basis images corresponding to these coefficients are combined by a weighted addition where the weight is according to each coefficient, producing an image approximating the block being encoded. However, it is common in video compression that only the lowest frequency coefficient is sent for the block. In case of DCT-like transforms, such an image would represent just a constant level or a level offset in case of residual image coding. In case the DST of some other KLT-like transform with a curved lower-frequency basis image, the bell-shaped basis image of DST or KLT transform may result in reconstruction artefacts, especially in smooth or slowly changing areas of an image. The examples of such artefacts are shown in FIGS. 3 and 4. The artefacts are long vertical stripes that are absent in the original image or video and arise because of a combination of vertical intra prediction and the non-flat shape of the corresponding 16×16 MDDT lowest-frequency basis image of FIG. 6*b*.

SUMMARY

Thus as stated above, it is beneficial to use DST and KLT-like transforms from the compression efficiency viewpoint but these transforms sometimes generate artifacts in the reconstructed images due to their curved or concave shaped lowest frequency basis images. According to the embodiments of the present invention a solution for encoding and decoding is provided that can improve the subjective quality of a reconstructed image when the encoding/decoding algorithm uses transforms that have non-flat lowest-frequency basis images. The decoder receives the transform coefficients of the current block. If there are multiple coefficients in the block, the decoder applies the default transform with non-flat lowest-frequency basis image. However, if there is only the lowest-frequency coefficient in the current block then the current residual block is reconstructed as flat having a constant level which value i.e. the magnitude depends on the lowest-frequency coefficient.

According to a first aspect a method in a decoder for decoding a bit stream representing a residual image block to be added to a predicted image block for obtaining a reconstructed image block is provided. In the method, the bit stream is received. The bit stream is then entropy decoded to identify transform coefficients of different frequencies of the transform block. It is determined if the transform coefficients comprises a single non-zero coefficient of a lowest frequency that is most sensitive to changes of an average value of the residual image block. If it is determined that the bit stream comprises a single non-zero coefficient of the lowest frequency that is most sensitive to changes of an average value of the residual image block, then a residual block is generated with a level depending on a value of the single non-zero coefficient, else a residual block is generated by deploying an inverse of the spatial 2D transform.

According to a second aspect, a decoder for decoding a bit stream representing a residual image block to be added to a predicted image block for obtaining a reconstructed image block is provided. The decoder comprises a receiving unit configured to receive the bit stream and an entropy decoder configured to entropy decoding the received bit stream to identify transform coefficients of different frequencies of a transform block. Further a decision module is configured to determine if the transform coefficients comprise a single non-zero coefficient of a lowest frequency that is most sensitive to changes of an average value of the residual image block. Accordingly, the decoder comprises a generator configured to generate a residual block with a level depending on a value of the single non-zero coefficient if it is determined that the bit stream comprises a single non-zero coefficient of the lowest frequency that is most sensitive to changes of an average value of the residual image block, and an inverse transformer configured to generate a residual block by deploying an inverse of the spatial 2D transform if it is not determined that the bit stream comprises a single non-zero coefficient of the lowest frequency that is most sensitive to changes of an average value of the residual image block.

An advantage with embodiments of the present invention is that they improve subjective quality. Moreover, they also have a positive effect on coding efficiency.

BRIEF DESCRIPTION OF THE DRAWINGS

FIG. 5 illustrates lowest frequency basis images for 8×8 block transforms. In FIG. 5*a* DCT is used while in FIG. 5*b* DST is used.

FIG. 6 illustrates lowest frequency basis images for 16×16 block transforms. In FIG. 5*a* DCT is used while in FIG. 5*b* MDDT 16 mode 0 (vertical prediction) is used.

DETAILED DESCRIPTION

In order to solve the problems with artifacts as illustrated in FIGS. 3 and 4, a decoder according to embodiments of the present invention is configured to reconstruct image blocks, where only the coefficient that is most sensitive to changes of the average value of the residual block is present, typically the lowest frequency coefficient, with a flat residual image. The lowest frequency coefficient is also referred to as DC coefficient in this description and in the drawings. The other image blocks are reconstructed by applying an inverse spatial 2D transform. Hence, the other image blocks comprise image blocks with multiple coefficients and image blocks with a single coefficient and wherein the single coefficient is not the coefficient that is most sensitive to changes of the average value of the residual block. The embodiments herein are exemplified by image blocks, these image blocks may also be video blocks, since the embodiments also are applicable to video blocks.

Figure 7:
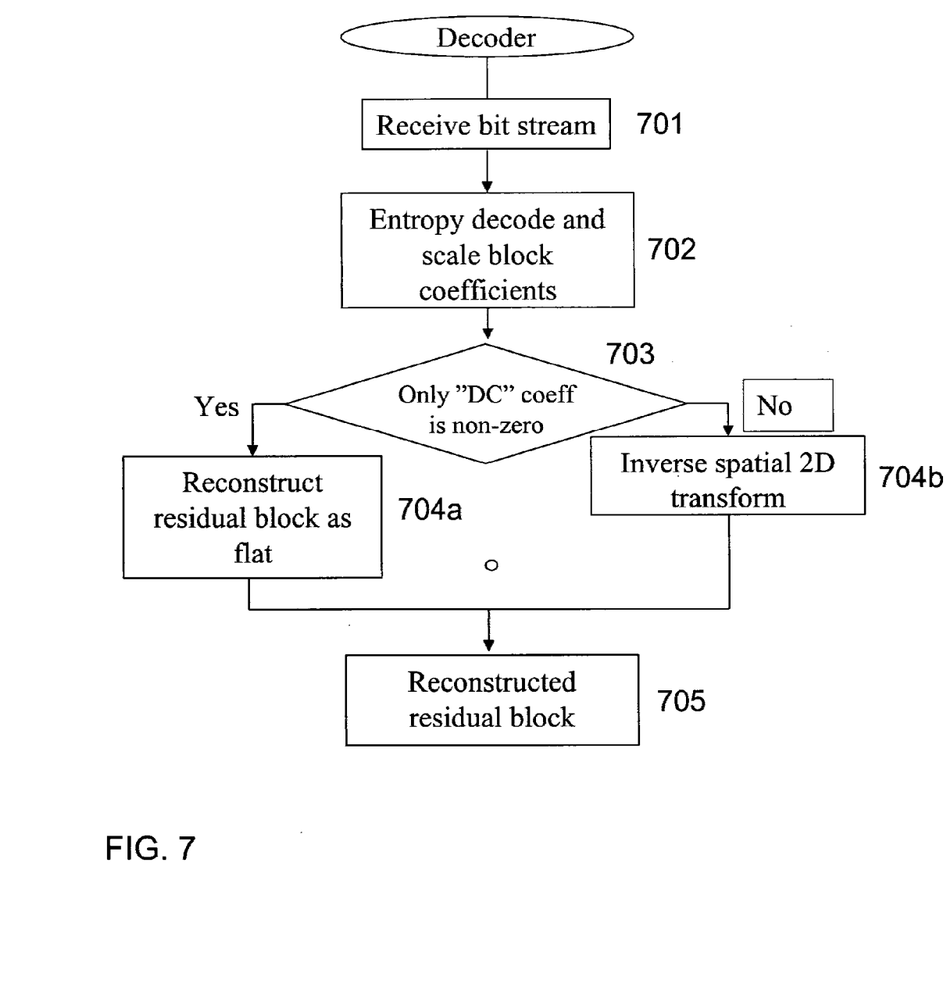
FIG. 7 is a flowchart of a method of decoding according to embodiments of the present invention.

Thus the decoder is configured to use the scheme of the flowchart of FIG. 7. A method in a decoder for decoding a bit stream representing a residual image block to be added to a predicted image block for obtaining a reconstructed image block is provided. The predicted image block may be obtained from a current decoded image frame in an intra prediction mode or a previously decoded image frame in an inter prediction mode. Examples of 2D transforms are KLT and DST like transforms. As illustrated in FIG. 7, the method comprises receiving 701 the bit stream and entropy decoding 702 the received bit stream to identify transform coefficients of different frequencies of the transform block. It is then determined 703 if the transform coefficients comprise a single non-zero coefficient of a lowest frequency that is most sensitive to changes of an average value of the residual image block.

If it is determined that the bit stream for the block comprises the only non-zero coefficient, which is the lowest coefficient that is most sensitive to changes of an average value of the residual image block e.g. corresponding to the lowest frequency basis image, then generating 704a a residual block with a level that depends on the value of the received non-zero lowest frequency coefficient.

Otherwise, generating 704b a residual block by applying the inverse spatial 2D transform. Finally, a reconstructed residual block is provided 705.

Figure 11:
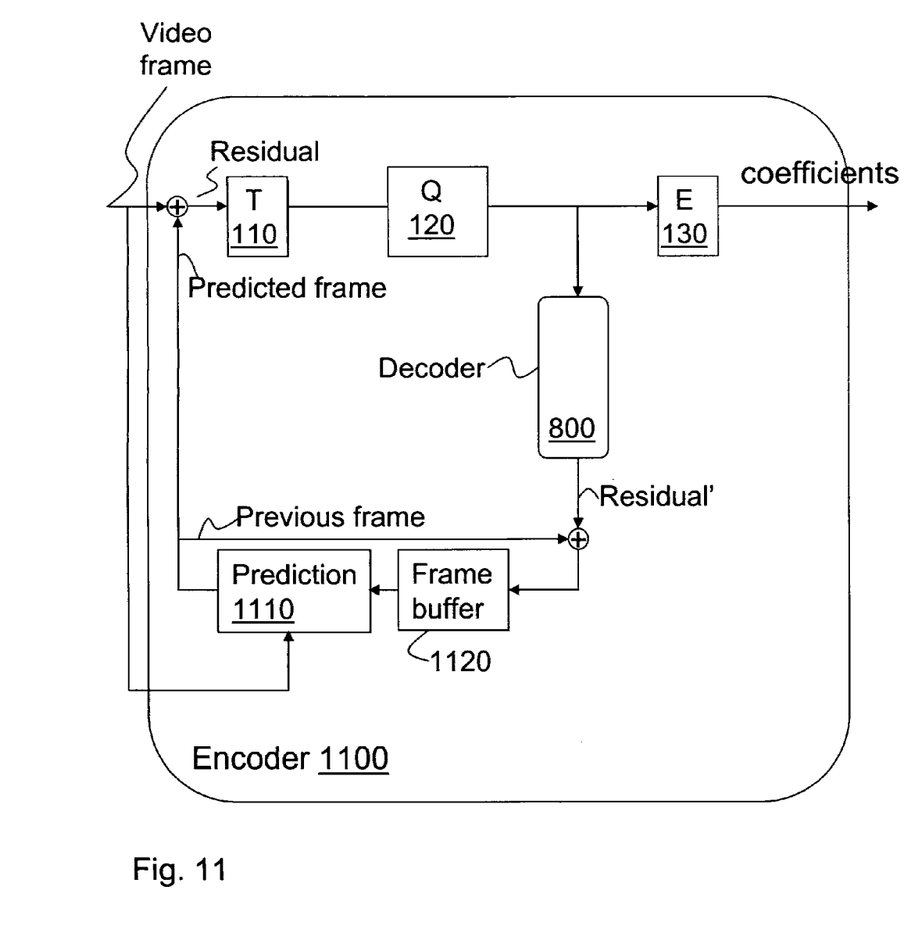
FIG. 11 illustrates schematically an encoder implementing the decoder according to embodiments of the present invention.

The same scheme can be used in the encoder when performing rate-distortion optimization. The encoder tries all intra prediction modes and inter prediction modes to find the modes that give best trade off between distortion and bits required for its representation. In this case the encoder can try to remove all but the lowest frequency coefficient to see if that is giving better rate-distortion performance than using the spatial 2D transformation. Then the encoder uses the same reconstruction algorithm as the decoder in order to avoid the encoder-decoder mismatch. This is schematically illustrated in FIG. 11. In FIG. 11, an encoder 1100 is illustrated having a transform unit 110, quantizesing unit 120 and entropy encoder as illustrated in FIG. 1. However, in this encoder a decoder 800 according to embodiments of the present invention is implemented to improve the prediction by reconstructing the residual denoted residual' by using the method of the embodiments of the present invention. A prediction unit 1110 can hence predict the video frame based on the residual' which is then used for determining the residual for a subsequent frame. The exemplified encoder 1110 in FIG. 11 uses inter prediction and comprises therefore a frame buffer 1120. It should be noted that other prediction modes such as intra prediction can also be used.

Accordingly, the method of the decoder can also be used in the encoder according to one embodiment.

An alternative approach to determine if the transform coefficients comprise a non-zero coefficient that is most sensitive to the average value of the residual block is present, typically the lowest frequency coefficient is to compare the rate distorsion performance of the single coefficient approach and 2D spatial transform. That means entropy encoding the transform coefficients and computing reconstruction error for both alternatives and choosing the solution with the lowest rate-distorsion cost. RDcost=SAD+lambda*bits where SAD is sum of absolute difference and bits are the bits that were needed to encode the residual and lambda is a scaling factor related to the quantization parameter that is used in quantization of transform coefficients.

According to a first embodiment the spatial 2D transform is a KLT like transform. In H.264 and other video coders, compression efficiency can be improved when using transforms optimized for the particular types of (residual) signal that possess certain characteristics similar to KLT. For example, the MDDT tool in KTA software uses different KLT-like transforms for compression of prediction residuals corresponding to different intra-prediction directions. However, in some of these transforms the lowest frequency, also referred to as DC, basis images have a concave form as shown in FIG. 5b. Therefore, when only one, the lowest frequency coefficient, is transmitted for the current block, the reconstructed residual has a concave form as the lowest frequency basis image of the KLT like transform. This may cause visual artifacts in flat image areas and lead to degradation of subjective quality as illustrated in FIGS. 3 and 4 where the vertical stripes are visual artifacts. According to the embodiments, better subjective and objective results can be achieved if the residual blocks that only have the lowest frequency coefficient are reconstructed as flat. Hence, the pixel values of the flat reconstruction depend on that single non-zero coefficient if applied to the current block coefficients with only the lowest-frequency coefficient being non-zero. This can also be exemplified by Equation 1 with N is equal to 1 and with $b_0(x,y)=1$ for all (x,y). Other constant values of $b_0(x,y)$ could also be used.

According to a second embodiment, the spatial 2D transform is a Discrete Sine Transform (DST). As stated above, DCT and DCT-like transforms are widely used in image and video coding. It is known that DCT is well suited for coding the signals that exhibit positive correlation between the samples. The example of such areas is slowly changing signal, such as flat or slowly changing gradient areas in the picture. The DST shows better compression efficiency than DCT for coding the signals where correlation coefficient between the samples is in the interval (−0.5, 0.5). An example of such areas in the residual signal are the residual areas (e.g. after motion compensation (MC)) with many small (high-frequency) details. Therefore, DST can be applied to the residual blocks containing mostly high-frequency information.

However, a similar problem can appear that has been described above for the KLT like transforms. The lowest frequency basis function of DST has a concave form. Therefore, there may be flat areas in the residual signal that are better reconstructed as a constant level. In accordance with the second embodiment, it is suggested to generate a residual block with a level that depends on the single non-zero DC lowest frequency coefficient, i.e. as flat for residual blocks that only have the lowest frequency coefficient.

Figure 8:
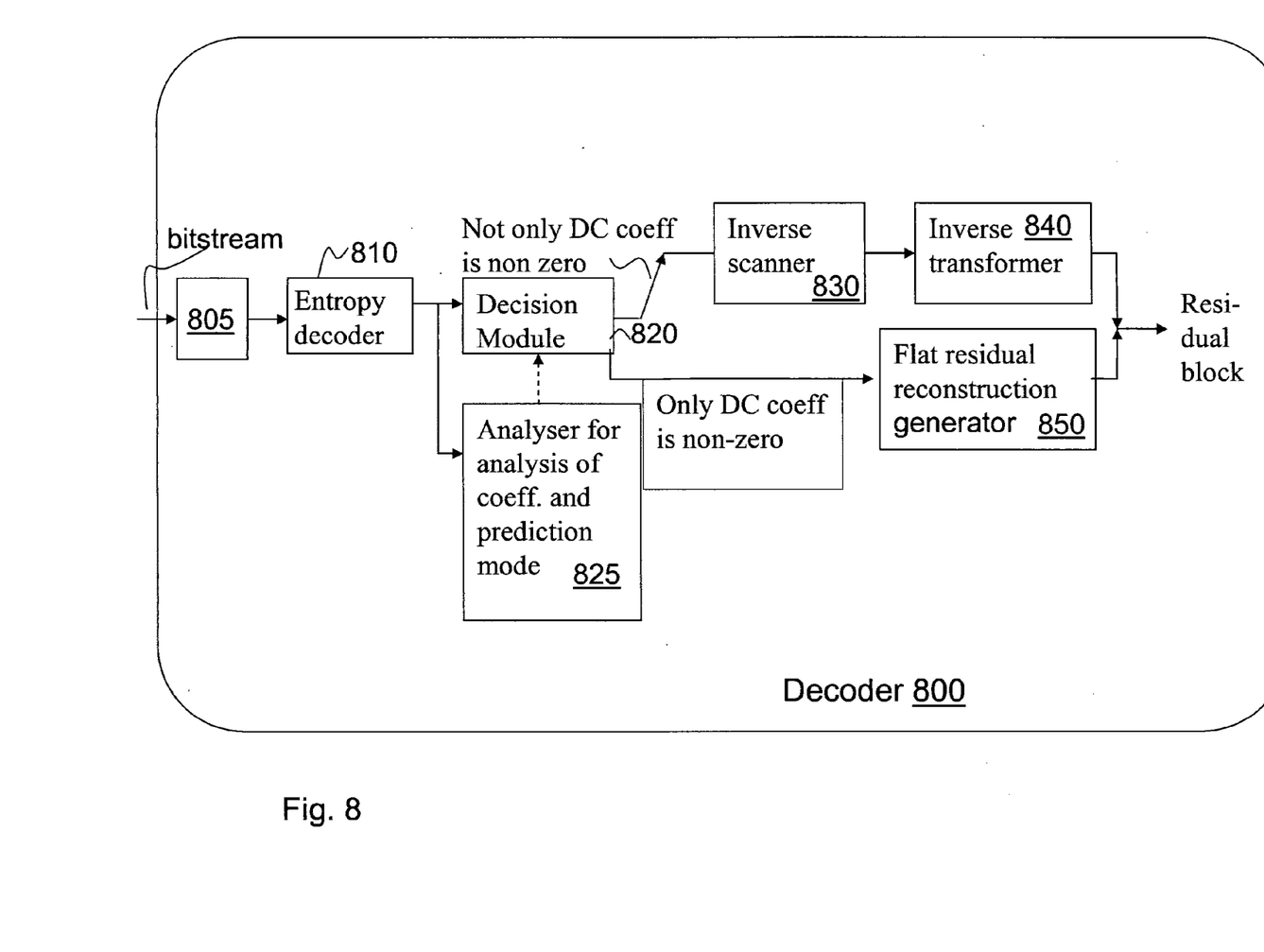
FIG. 8 illustrates schematically a decoder according to embodiments of the present invention.

FIG. 8 illustrates a decoder according to embodiments of the present invention. The functionality of the decoder may be implemented by software or hardware or a combination thereof.

The decoder comprises a receiving unit 805 configured to receive the bit stream. The decoder comprises an entropy decoder 810, which may be a variable length decoder (VLC) or context adaptive binary arithmetic decoder (CABAC). Transform coefficients and prediction mode are derived from the bitstream. Hence, the received bit stream is entropy decoded by the entropy decoder 810 to identify transform coefficients of different frequencies of the transform block. Further a decision module 820 e.g. by means of an analyser 825 is configured to determine if the transform coefficients comprises a single non-zero coefficient of a lowest frequency that is most sensitive to changes of an average value of the residual image block. Further if the method of the embodiment is only deployed for a certain mode of prediction coding e.g. intra prediction coding, the decision module is also configured to determine the prediction coding mode.

A generator 850 is provided to generate a residual block with a level, e.g. a constant level, that depends on a value of the single non-zero coefficient if it is determined that the bit stream comprises a single non-zero coefficient of a lowest frequency that is most sensitive to changes of an average value of the residual image block. Moreover, an inverse transformer 840 is provided which is configured to generate a residual block by deploying an inverse of the spatial 2D transform if it is not determined that the bit stream comprises a single non-zero coefficient of the lowest frequency that is most sensitive to changes of an average value of the residual image block.

If not only the lowest frequency basis function is non-zero, an inverse scan is performed by an inverse scanner. Inverse scan implies that the transform coefficients are encoded in a certain order from highest frequency coefficients towards low frequency coefficients, or the other way around. Both the encoder and the decoder perform the scan in the same order. In addition, an inverse quantization is performed. The encoder quantizes transform coefficients e.g. the coefficients are divided by a quantization parameter or shifted to the right. The decoder multiplies or the transform coefficients by the scaling factor (equal to the quantization parameter) or shifts coefficients to the left. Finally, the inverse transform is applied to generate the residual block.

Thus if it is determined that the bitstream only comprises a lowest coefficient that is most sensitive to changes of an average value of the residual image block then the residual block is generated as flat with a level dependent on the single coefficient instead of applying the inverse of the spatial 2D transform.

As mentioned above, the decoder is configured to be implemented in an encoder according to one embodiment as illustrated in FIG. 11.

The inverse transform reconstruction according to embodiments can be applied to all DST and KLT-like transforms or to a particular set of transforms that exhibit visual artefacts because of the non-flat form of the prediction residual. For example, in one alternative the embodiments of the invention are applied only to the transform blocks that correspond to a vertical prediction mode in MDDT. Intra-prediction consists typically of prediction in different directions such as vertical, horizontal or diagonal directions. For example, the prediction uses pixel values above the current block when doing vertical prediction.

To achieve better rate-distortion optimization in the encoder and to prevent the encoder-decoder drift, the same decoding procedure should also be applied in the video encoder.

Figure 9:
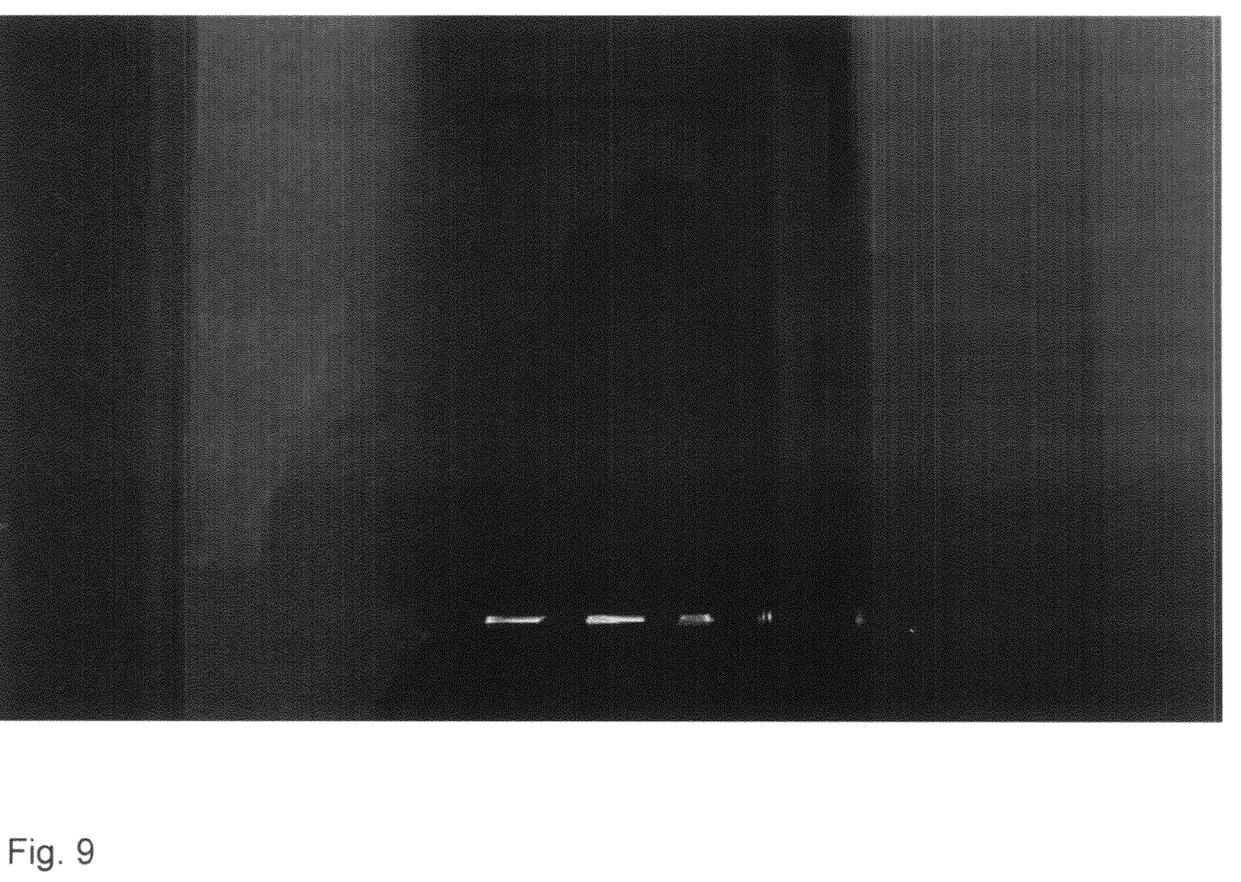
FIG. 9 corresponds to FIG. 3 and FIG. 10 corresponds to FIG. 4 with the difference that the first embodiment is used which results in that the artifacts shown in FIGS. 3 and 4 have disappeared.
Figure 10:
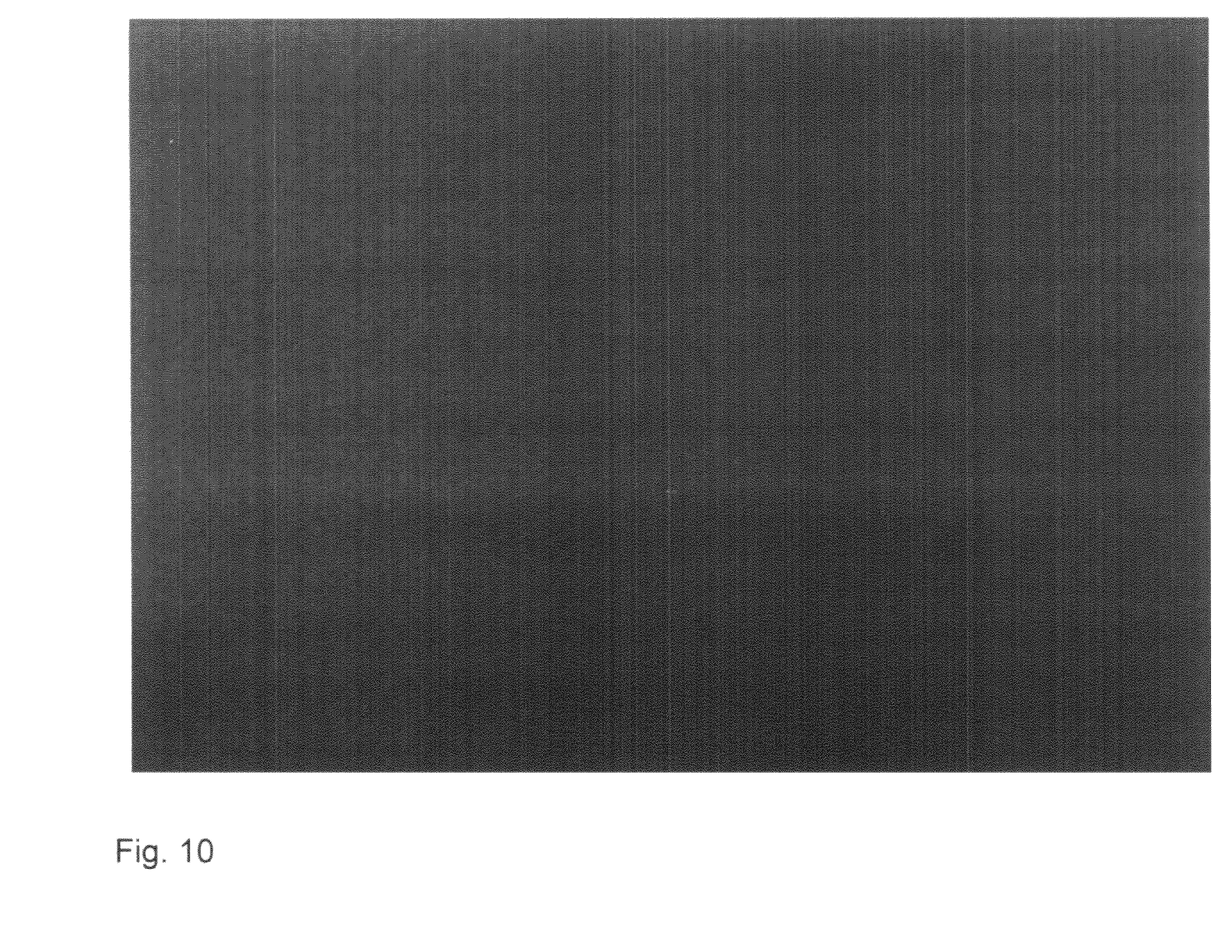

The subjective results of the first embodiment are shown in FIGS. 9 and 10. One can see that the visual artifacts in FIGS. 3 and 4 due to MDDT's non-flat basis images have disappeared in FIGS. 9 and 10 as a result of implementing the first embodiment. Using the flat reconstruction, when there is only the lowest frequency coefficient in the block, provides better subjective quality in the flat areas of the picture. This approach also brings coding efficiency improvements compared to using only directional transforms which is shown in Table 1.

Accordingly, the objective results of the implementation of this embodiment are provided in Table 1, which shows reduction of bitrate (BD_rate in %) of the first embodiment compared to MDDT.

| Sequence | MDDT | 1$^{st}$ embodiment |
|---|---|---|
| ParisCIF30 | −5.40 | −5.40 |
|  | −5.14 | −5.14 |
| MobileCIF30 | −3.49 | −3.50 |
| TempeteCIF30 | −4.34 | −4.36 |
| nuts5_832×480_30 | −8.31 | −9.29 |
| flower4_832×480_30 | −6.96 | −7.08 |
| keiba3_832×480_30 | −6.42 | −6.47 |
| Janine1_8SVGA25 | −6.99 | −6.99 |
| BigShips720p60 | −5.99 | −5.99 |
| City720p60 | −6.51 | −6.52 |
| Crew720p60 | −7.72 | −7.86 |
| Night720p60 | −5.87 | −5.89 |
| Jets720p60 | −13.47 | −13.74 |
| Raven720p60 | −8.08 | −8.08 |
| CrowdRun1080p60 | −5.43 | −5.44 |
| ParkJoy1080p60 | −4.70 | −4.71 |
| sunflower1080p25 | −6.53 | −6.55 |
| toys_and_calendar 1080p25 | −5.98 | −6.00 |
| Traffic_1920×1080_p30 | −7.44 | −7.45 |
| Average | −6.57 | −6.66 |

The table compares the Bjontegaard delta (BD) rate which is reduction of bitrate, in percents for MDDT and the first embodiment. (The BD-Rate numbers correspond to how much the bit-rate changes for the same PSNR (Peak-Signal-to-Noise-Ratio). So, a BD-rate=−1% means that the first embodiment can achieve the same visual quality (PSNR) as an anchor, i.e. a BD reference, with using 1% less bits). These variants are compared to the KTA anchor without the MDDT. In the experiments, the sequences are encoded using only Intra-frames, i.e. no inter prediction is performed. One can see that the first embodiment shows somewhat better compression efficiency than MDDT while providing significant subjective quality improvements on the flat areas of the image. Hence a larger negative number indicates a better quality than a smaller negative number or a positive number.

The invention claimed is:

1. A method in a decoder for decoding a bit stream representing a residual image block to be added to a predicted image block for obtaining a reconstructed image block, the method comprising:
   receiving the bit stream,
   entropy decoding the received bit stream to identify transform coefficients of different frequencies of a transform block,
   determining if the transform coefficients comprise a single non-zero coefficient of a lowest frequency that is most sensitive to changes of an average value of the residual image block,
   if the transform coefficients comprise said single non-zero coefficient, generating a residual block with a level depending on a value of the single non-zero coefficient, and
   otherwise if the transform coefficients do not comprise said single non-zero coefficient, generating a residual block by deploying an inverse of the spatial 2 dimension (2D) transform.

2. The method according to claim 1, wherein the spatial 2D transform is a Karhunen-Loève Transform (KLT) like transform.

3. The method according to claim 1, wherein the spatial 2D transform is a Discrete Sine Transform (DST) transform.

4. The method according to claim 1, wherein the predicted image block has been obtained from a current image in an intra prediction mode.

5. The method according to claim 1, wherein the predicted image block has been obtained from a previously decoded image in an inter prediction mode.

6. The method according to claim 1, wherein the method is used in an encoder for prediction.

7. A decoder for decoding a bit stream representing a residual image block to be added to a predicted image block for obtaining a reconstructed image block, the decoder comprising:
- a receiving unit configured to receive the bit stream,
- an entropy decoder configured to entropy decode the received bit stream to identify transform coefficients of different frequencies of a transform block,
- a decision module configured to determine if the transform coefficients comprise a single non-zero coefficient of a lowest frequency that is most sensitive to changes of an average value of the residual image block,
- a generator configured to generate a residual block with a level depending on a value of the single non-zero coefficient if the transform coefficients comprise said single non-zero coefficient, and
- an inverse transformer configured to generate a residual block by deploying an inverse of the spatial 2 dimension (2D) transform if the transform coefficients do not comprise said single non-zero coefficient.

8. The decoder according to claim 7, wherein the spatial 2D transform is a Karhunen-Loève Transform (KLT) like transform.

9. The decoder according to claim 7, wherein the spatial 2D transform is a Discrete Sine Transform (DST) transform.

10. The decoder according to claim 7, wherein the predicted image block has been obtained from a current image in an intra prediction mode.

11. The decoder according to claim 7, wherein the predicted image block has been obtained from a previously decoded image in an inter prediction mode.

12. The decoder according to claim 7, wherein the decoder is configured to be implemented in an encoder.

* * * * *